United States Patent
Kihara et al.

(10) Patent No.: US 10,809,857 B2
(45) Date of Patent: Oct. 20, 2020

(54) ELECTRONIC DEVICE

(71) Applicant: Murata Manufacturing Co., Ltd., Nagaokakyo-shi, Kyoto-fu (JP)

(72) Inventors: Takashi Kihara, Nagaokakyo (JP); Hideki Kawamura, Nagaokakyo (JP)

(73) Assignee: MURATA MANUFACTURING CO., LTD., Nagaokakyo-shi, Kyoto-Fu (JP)

( * ) Notice: Subject to any disclaimer, the term of this patent is extended or adjusted under 35 U.S.C. 154(b) by 0 days.

(21) Appl. No.: 16/021,265

(22) Filed: Jun. 28, 2018

(65) Prior Publication Data

US 2018/0314365 A1 Nov. 1, 2018

Related U.S. Application Data

(63) Continuation of application No. PCT/JP2016/086333, filed on Dec. 7, 2016.

(30) Foreign Application Priority Data

Jan. 12, 2016 (JP) ................................ 2016-003767

(51) Int. Cl.
*G06F 3/044* (2006.01)
*G06F 3/01* (2006.01)
(Continued)

(52) U.S. Cl.
CPC ............... *G06F 3/044* (2013.01); *G01L 1/16* (2013.01); *G06F 3/016* (2013.01); *G06F 3/0488* (2013.01);
(Continued)

(58) Field of Classification Search
CPC .......................... G06F 3/044; G06F 3/04144
See application file for complete search history.

(56) References Cited

U.S. PATENT DOCUMENTS 9,152,015 B2  10/2015  Nakayama
9,652,067 B2   5/2017  Yamano et al.
(Continued)

FOREIGN PATENT DOCUMENTS

JP  2009163363 A  7/2009
JP  2011059821 A  3/2011
(Continued)

OTHER PUBLICATIONS

International Search Report issued for PCT/JP2016/086333, dated Feb. 21, 2017.

(Continued)

*Primary Examiner* — Lixi C Simpson
(74) *Attorney, Agent, or Firm* — Arent Fox LLP

(57) ABSTRACT

A display device includes a housing, an operation plate, an electrostatic sensor, a piezoelectric sensor, a controller, a storage unit, a display, and a communication unit. When an output voltage of the piezoelectric sensor indicates a first voltage value ($V_{th1}$) or larger, the controller determines that the piezoelectric sensor has detected a change in a first pressing force and performs first processing. When an output voltage of the piezoelectric sensor indicates a second voltage value ($V_{th2}$) or larger, the controller determines that the piezoelectric sensor has detected a change in a second pressing force. When the piezoelectric sensor detects the change in the second pressing force and the electrostatic sensor continuously detects a touch during a period from the detection of the first pressing force to the detection of the second pressing force, the controller executes second processing.

11 Claims, 16 Drawing Sheets

(51) Int. Cl.
   *G01L 1/16* (2006.01)
   *G06F 3/0488* (2013.01)
(52) U.S. Cl.
   CPC .............. *G06F 2203/04103* (2013.01); *G06F 2203/04105* (2013.01)

(56) References Cited

U.S. PATENT DOCUMENTS

| | | | | |
|---|---|---|---|---|
| 10,222,889 | B2* | 3/2019 | Picciotto | G06F 3/0488 |
| 2009/0309616 | A1* | 12/2009 | Klinghult | G06F 3/044 |
| | | | | 324/686 |
| 2011/0057903 | A1* | 3/2011 | Yamano | G06F 3/0237 |
| | | | | 345/174 |
| 2011/0115717 | A1* | 5/2011 | Hable | G06F 3/0416 |
| | | | | 345/173 |
| 2011/0155479 | A1* | 6/2011 | Oda | G06F 3/03545 |
| | | | | 178/18.06 |
| 2012/0314120 | A1 | 12/2012 | Nakayama et al. | |
| 2013/0328803 | A1 | 12/2013 | Fukushima et al. | |
| 2014/0062949 | A1* | 3/2014 | Chang | G06F 3/044 |
| | | | | 345/174 |
| 2016/0357297 | A1* | 12/2016 | Picciotto | G06F 3/0488 |
| 2016/0357305 | A1* | 12/2016 | Wells | G06F 3/0416 |
| 2017/0220172 | A1 | 8/2017 | Yamano et al. | |

FOREIGN PATENT DOCUMENTS

| | | |
|---|---|---|
| JP | 2013257657 A | 12/2013 |
| WO | 2011102192 A1 | 8/2011 |

OTHER PUBLICATIONS

Written Opinion of the International Searching Authority issued for PCT/JP2016/086333, dated Feb. 21, 2017.

* cited by examiner

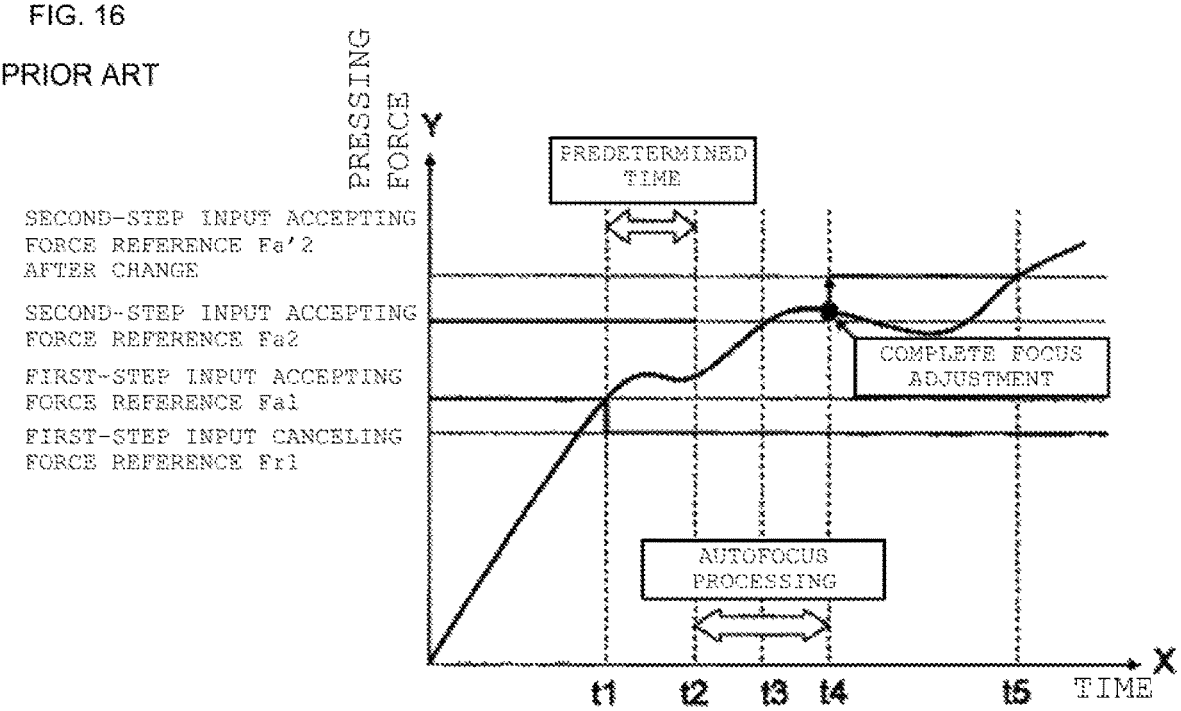

ELECTRONIC DEVICE

CROSS REFERENCE TO RELATED APPLICATIONS

The present application is a continuation of International application No. PCT/JP2016/086333, filed Dec. 7, 2016, which claims priority to Japanese Patent Application No. 2016-003767, filed Jan. 12, 2016, the entire contents of each of which are incorporated herein by reference.

TECHNICAL FIELD

The present invention relates to an electronic device that accepts inputs in a plurality of steps in accordance with a pressing force.

BACKGROUND ART

In recent years, various electronic devices have been devised which accept inputs in a plurality of steps in accordance with a pressing force. For example, International Publication No. 2011/102192 (Patent Document 1) discloses an electronic device that accepts inputs in two steps in accordance with a pressing force.

FIG. 16 is a diagram showing a relationship between elapsed time and a pressing force applied to an operation surface in the electronic device of Patent Document 1. The electronic device of Patent Document 1 includes a force detection unit that detects a pressing force applied to an input surface, and a controller that performs autofocus processing for automatically adjusting a focus on a subject when the force detection unit detects a pressing force satisfying a first force reference Fa1 for accepting a first-step input.

When the force detection unit detects a pressing force satisfying a second force reference Fa2 for accepting a second-step input, the controller performs control so that a still image is acquired. The second force reference Fa2 is larger than the first force reference Fa1.

On the other hand, when the force detection unit detects a pressing force satisfying the second force reference Fa2 for accepting the second-step input during a period from the start of the autofocus processing to the completion of the adjustment of the focus on the subject, the controller performs control so that a still image is not acquired.

With the above configuration, the electronic device of Patent Document 1 accepts inputs in two steps in accordance with the pressing force applied to the operation surface and executes different processing in each of the first step and the second step. Then, at the second-step input, an operator needs to perform pressing with a force stronger than the force of the first-step pressing.

However, an operation unit (an operation surface) of a smartphone, a tablet, or the like is made of a hard material such as glass and is not easily deformed. It is thus difficult for the operator to perform pressing at the second-step input with a force that is stronger than the force of the first-step pressing. Therefore, the conventional electronic device has a problem of poor operability.

An object of the present invention is to provide an electronic device with improved operability relative to a conventional electronic device.

BRIEF DESCRIPTION OF THE INVENTION

An electronic device of the present invention includes an operation surface, a touch detection sensor, a piezoelectric sensor, and a controller. The operation surface accepts a touch/pressing input from an operator. The touch detection sensor detects a touch operation on the operation surface. The piezoelectric sensor detects a change in the pressing force applied to the operation surface.

The controller executes first processing when the piezoelectric sensor detects a change in a first pressing force. On the other hand, the controller executes second processing when the piezoelectric sensor detects a change in a second pressing force and the touch detection sensor continuously detects the presence of a touch operation during a period from the detection of the first pressing force to the detection of the second pressing force. For example, when an output of the piezoelectric element indicates a first threshold or larger, the controller determines that the piezoelectric sensor has detected a change in the first pressing force, and when an output of the piezoelectric sensor indicates a second threshold or larger, the controller determines that the piezoelectric sensor has detected a change in the second pressing force. In this case, the second threshold is preferably equal to or smaller than the first threshold.

In this configuration, the piezoelectric sensor is an element in which a differential value of the pressing force is proportional to the output. For this reason, when the operator makes first-step pressing (half pressing) and then maintains a half-pressing state, a charge generated by the piezoelectric element is zero despite the fact that the piezoelectric element is being deformed.

Therefore, when the operator maintains the half-pressing state, the piezoelectric sensor cannot detect second-step pressing (full pressing) unless a pressing force being the half pressing or more is applied to the operation unit. Consequently, when the operator maintains the half-pressing state, it is necessary to apply an extremely large pressing force to the operation unit.

However, in the electronic device with this configuration, the touch detection unit detects a touch operation applied to the operation sensor. Thus, after applying the first pressing force to the operation sensor, the operator releases the first pressing force and continues to apply a touch operation on the operation sensor, thereby eliminating the need to perform pressing at the second-step input with a force stronger than the force of the first-step pressing. That is, even if the operator performs a pressing operation with a second pressing force that is weaker than the first pressing force at the second-step input, the controller can execute the second processing.

Therefore, the electronic device with this configuration can improve the operability as compared with the conventional electronic device.

The electronic device of the present invention can improve the operability as compared with the conventional electronic device.

BRIEF EXPLANATION OF DRAWINGS

FIG. 16 is a diagram showing a relationship between elapsed time and a pressing force applied to an operation surface in an electronic device of Patent Document 1.

MODE FOR CARRYING OUT THE INVENTION

Figure 1:
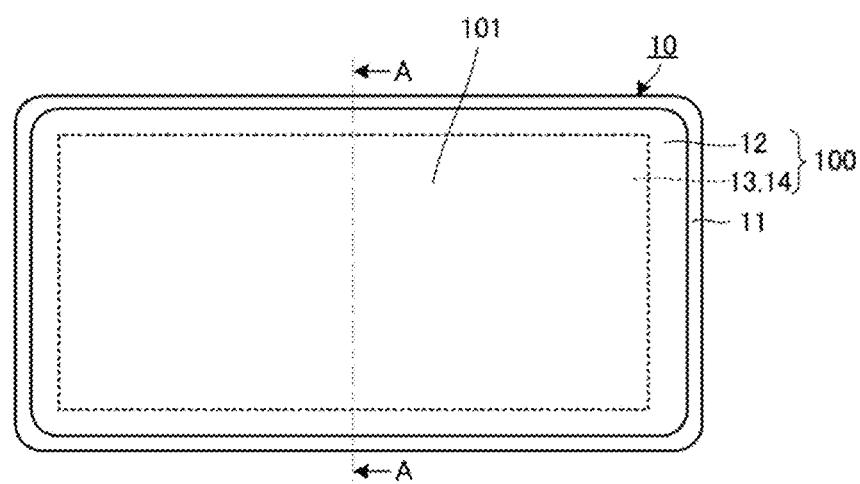
FIG. 1 is a plan view of a display device 10 according to a first embodiment of the present invention.
Figure 1:
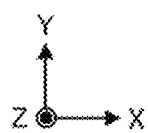
Figure 2:
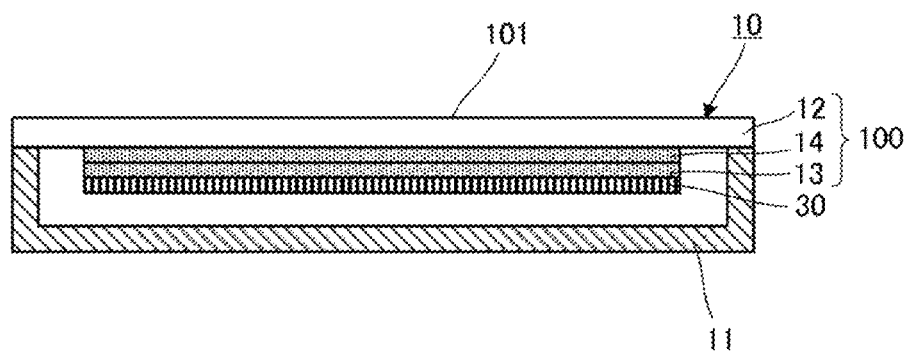
FIG. 2 is a sectional view taken along a line A-A shown in FIG. 1.
Figure 2:
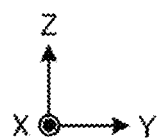

Hereinafter, a display device according to a first embodiment of the present invention will be described with reference to the drawings.

As shown in FIGS. 1 to 4, the display device 10 includes a housing 11, an operation plate 12, an electrostatic sensor 14, a piezoelectric sensor 13, a controller 20, a storage unit 40, a display 30, and a communication unit 61. The display device 10 is, for example, a smart phone, a tablet, or the like. The operation plate 12, the electrostatic sensor 14, and the piezoelectric sensor 13 together constitute a touch panel 100.

The housing 11 is made up of a frame-shaped side surface and a rectangular bottom surface and has a rectangular opening. The operation plate 12 abuts the housing 11 so as to close the opening of the housing 11 and has an operation surface 101 for accepting an input from an operator. The operation plate 12 is preferably made of a material, for example, glass, PET, or PP, having insulation properties and translucency.

The storage unit 40 is, for example, a flash memory. The storage unit 40 stores a control program in which a control method for each unit of the display device 10 is described. The control program is preferably installed with a plurality of pieces of application software including browser software described later.

The controller 20 (e.g., a CPU) is preferably disposed on the inner bottom surface of the housing 11 and is electrically connected to the electrostatic sensor 14 and the piezoelectric sensor 13. As described further below, the controller 20 controls an operation of each unit of the display device 10 in accordance with the control program stored in the storage unit 40.

The communication unit 61 has an antenna, not shown, and typically communicates with a server device (not shown) via a base station connected to a mobile phone network.

The display 30 preferably includes a liquid crystal panel, a polarizing plate, and a backlight. The display 30 is electrically connected to the controller 20.

Note that the display device 10 is an example of the electronic device. The operation plate 12 is an example of the operation unit. The electrostatic sensor 14 is an example of the touch detection sensor.

In the following description, a longitudinal direction of the operation surface 101 of the operation plate 12 will be referred to as an X direction, a short direction of the operation surface 101 of the operation plate 12 will be referred to as a Y direction, and a thickness direction of the operation plate 12 will be referred to as a Z direction.

Figure 3:
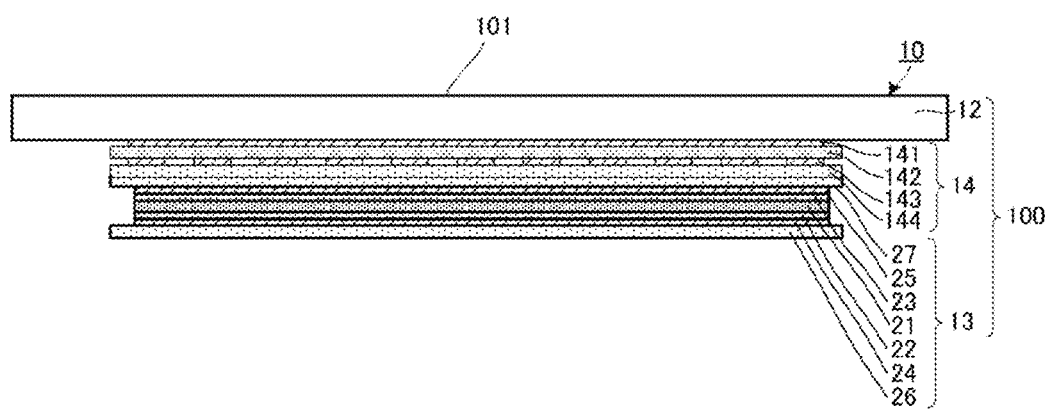
FIG. 3 is an enlarged sectional view taken along the line A-A shown in FIG. 1.
Figure 3:
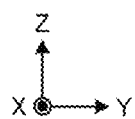
Figure 4:
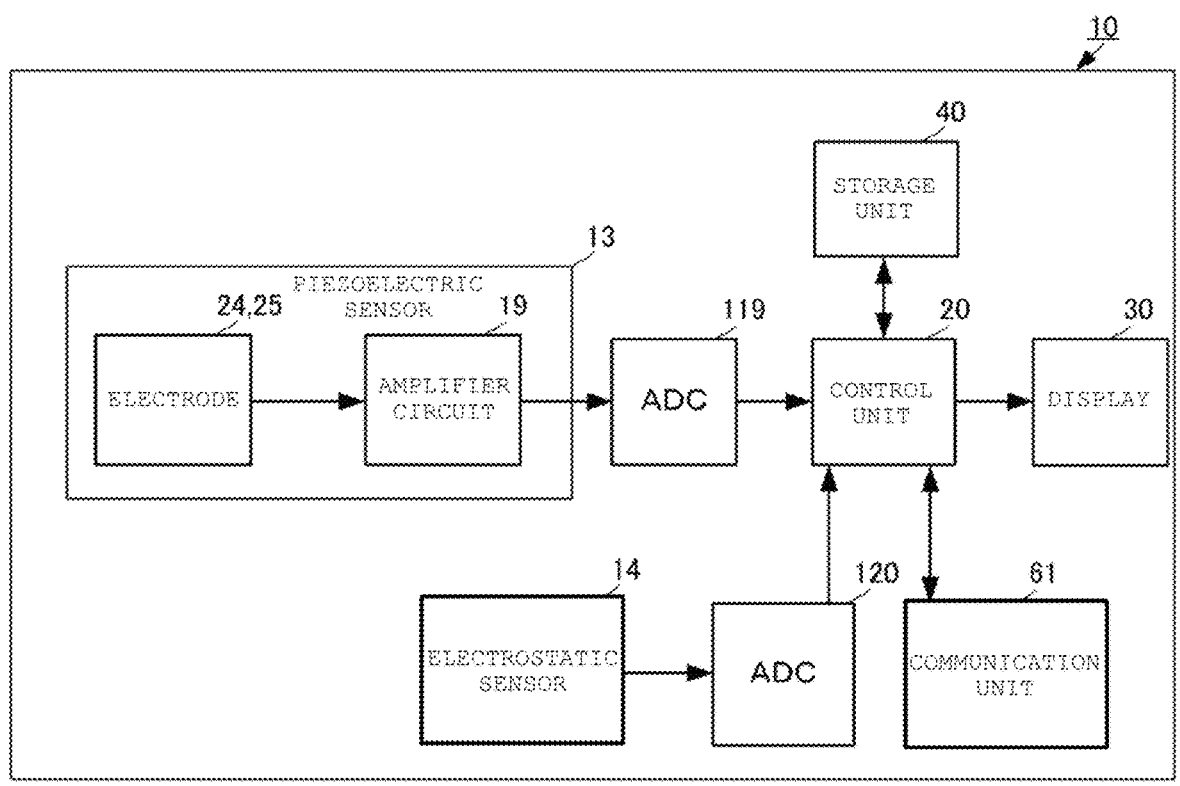
FIG. 4 is a block diagram of the display device 10 shown in FIG. 1.

As shown in FIGS. 3 and 4, the electrostatic sensor 14 touches the surface of the operation plate 12 on the side opposite to the operation surface 101. The electrostatic sensor 14 includes a plurality of electrostatic capacitance detecting electrodes 11D1, a plate-shaped insulating substrate 11D2, a plurality of electrostatic capacitance detecting electrodes 11D3, a plate-shaped insulating substrate 11D4, and an amplification circuit, not shown.

The electrostatic sensor 14 detects a touch operation applied to the operation surface 101. The electrostatic sensor 14 detects an electrostatic capacitance change, which occurs when the operator's finger approaches or touches the operation surface 101, with the electrostatic capacitance detecting electrodes 11D1 and 11D3.

The electrostatic sensor 14 generates and amplifies a touch detection signal indicating values of the detection capacitances of the electrostatic capacitance detecting electrodes 11D1, 11D3. The signal level of the touch detection signal depends on an amount of change in the electrostatic capacitance that is generated when the operator's finger approaches or touches the electrostatic sensor 14. The electrostatic sensor 14 outputs the generated (analog) touch detection signal to an AD converter 120.

The AD converter 120 converts the analog touch detection signal to a digital touch detection signal and outputs the so converted touch detection signal to the controller 20. When detecting that a signal level of the touch detection signal is larger than a predetermined threshold, the controller 20 determines an operation position as a function of the touch detection signal.

As shown in FIGS. 3 and 4, the piezoelectric sensor 13 is preferably in contact with the surface of the electrostatic sensor 14 on the side opposite to the operation plate 12. The piezoelectric sensor 13 preferably includes a piezoelectric film 21, optically clear adhesives (OCAs) 22, 23, plate electrodes 24, 25, substrates 26, 27, and an amplifier circuit 19. The OCAs 22, 23 are preferably transparent adhesives. The piezoelectric sensor 13 detects a change in the pressing force applied to the operation surface 101.

The plate electrode 24 is preferably formed on the main surface of the substrate 26 facing the piezoelectric film 21. The plate electrode 25 is formed on the main surface of the substrate 27 facing the piezoelectric film 21. The plate electrodes 24, 25 are preferably made of a metal film such as a copper foil. The materials of the substrates 26, 27 are preferably PET resin, polyimide resin, and the like.

The piezoelectric film 21 has a first main surface and a second main surface. On the first main surface of the piezoelectric film 21, the plate electrode 24 is disposed via the OCA 22. The OCA 22 attaches the plate electrode 24 to the first main surface of the piezoelectric film 21.

Meanwhile, the plate electrode 25 is disposed on the second main surface of the piezoelectric film 21 via the OCA 23. The OCA 23 attaches the plate electrode 25 to the second main surface of the piezoelectric film 21. The plate electrodes 24, 25 are electrically connected to the amplifier circuit 19.

A material for the piezoelectric film 21 is, for example, L-type polylactic acid (PLLA). PLLA is a chiral polymer and has a main chain with a helical structure. PLLA has piezoelectricity when PLLA is uniaxially stretched and molecules are oriented. A piezoelectric constant of uniaxially stretched PLLA belongs to a group of very high piezoelectric constants among polymers.

Note that the piezoelectric film 21 is not limited to a film mainly made up of PLLA, but may, for example, be a film made of other chiral polymers such as D-type polylactic acid (PDLA) and poly-γ-benzyl-L-glutamate (PBLG). However, the piezoelectricity of the piezoelectric film 21 is preferably mainly made up of chiral macromolecules such as PLLA and PDLA is not exhibited by ion polarization as in ferroelectrics such as polyvinylidene fluoride (PVDF) and lead zirconate titanate (PZT), but is derived from a helical structure which is a characteristic structure of molecules.

For this reason, PLLA generates piezoelectricity as a result of molecule orientation processing by stretching or the like and does not require polling processing unlike other polymers such as PVDF or piezoelectric ceramics. That is, the piezoelectricity of PLLA not belonging to ferroelectrics is exhibited not by ion polarization as in ferroelectrics such as PVDF and PZT, but the piezoelectricity of PLLA derives from the helical structure which is the characteristic structure of molecules.

Hence PLLA does not exhibit pyroelectricity that is generated by other ferroelectric piezoelectric bodies. The piezoelectric constant of PVDF or the like temporally fluctuates and, in some cases, remarkably decreases, whereas the piezoelectric constant of PLLA is temporally very stable.

When three axes are taken in an extending direction of PLLA and one or two axes are taken in a direction vertical to the triaxial direction, piezoelectric constant d14 (shear piezoelectric constant) exists in PLLA. That is, the PLLA is a piezoelectric body having shear piezoelectricity. The piezoelectric film 21 in a stripe shape is cut out so that the uniaxial direction is the thickness direction and a direction forming an angle of 45° with respect to the triaxial direction (extending direction) is the longitudinal direction. As a result, when the piezoelectric film 21 extends and contracts in the longitudinal direction, the piezoelectric film 21 is polarized in the thickness direction.

While it is most effective that the uniaxial direction is 45°, substantially the same effect can be obtained even if the uniaxial direction is in the range of 45±10°, for example.

Next, a scenario will be described where the piezoelectric sensor 13 detects pressing.

Figure 5:
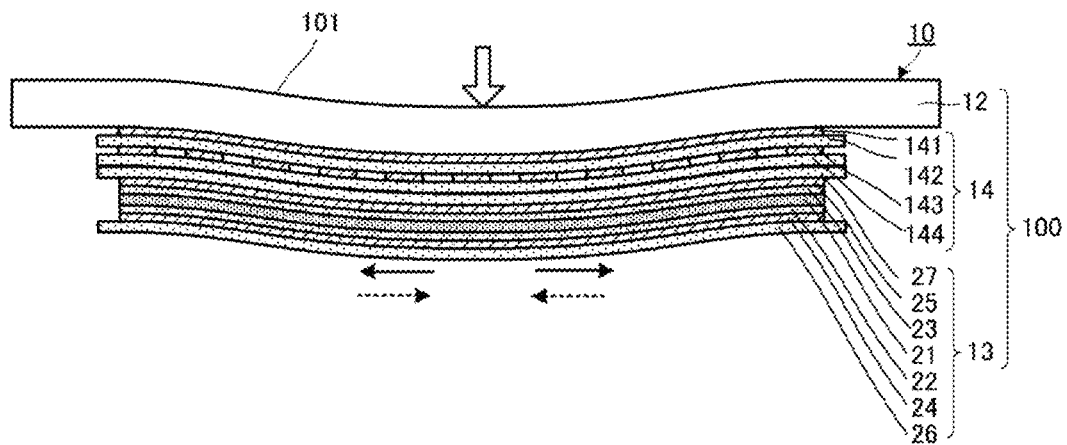
FIG. 5 is a sectional view of a touch panel 100 pressed by an operator.
Figure 5:
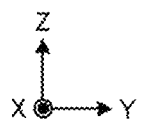

FIG. 5 is a sectional view of the touch panel 100 pressed by the operator.

In FIG. 5, in order to explain how the operation plate 12 and the piezoelectric sensor 13 are deflected, the deflection is emphasized. A hollow arrow in FIG. 5 indicates a direction in which the operator performs the pressing operation. Black (solid) arrows in FIG. 5 indicate directions in which the piezoelectric film 21 expands and contracts.

A peripheral edge of the operation plate 12 is fixed to the housing 11. Thus, as shown in FIG. 5, when a part of the operation surface 101 is pressed by the operator, the operation plate 12, and with it the piezoelectric sensor 13 bends so as to become convex in the pressing direction.

For this reason, the piezoelectric sensor 13 extends (distorts) in the longitudinal direction (Y direction). That is, the piezoelectric film 21, which is part of the piezoelectric sensor 13, extends in the longitudinal direction. The piezoelectric film 21 is thus polarized in the thickness direction due to a piezoelectric effect.

Charges are induced in the plate electrodes 24, 25 by charges generated on both the main surfaces of the piezoelectric film 21. Charges generated in the plate electrodes 24, 25 are output to the amplifier circuit 19.

Returning to FIG. 4, the amplifier circuit 19 generates and amplifies a signal based on the outputs of the plate electrodes 24, 25 as a press detection signal. Then, the amplifier circuit 19 outputs a press detection signal to the AD converter 119. The AD converter 119 AD-converts the analog press detection signal to a digital press detection signal and outputs it to the controller 20.

The controller 20 determines the operation input by the user based on the input press detection signal and the touch detection signal. The controller 20 generates image data based on the input operation and outputs the generated image data to the display 30. The display 30 displays an image on the operation surface 101 based on the image data.

The controller 20 determines the operation input in two steps in accordance with how much pressure is applied to the operation surface 10 of the operation plate 12 as indicated by the press detection signal and executes different processing in each of the first step and the second step. Specifically, when the press detection signal (which is an output voltage) is a first voltage value Vth1 or larger, the controller 20 determines that the piezoelectric sensor 13 has detected a change in a first pressing force applied to the operation surface 101 and executes a first processing.

On the other hand, when the press detection signal indicates a second voltage value Vth2 or larger, the controller 20 determines that the user has applied the second pressing force to the operation plate 12. If the press detection signal indicates that the second processing force has been applied to the operation plate 12 and the touch detection signal indicates that a touching operation has been continuously applied to the operation surface 101 during the entire period from the detection of the first pressing force to the detection of the second pressing force, the controller 20 executes a second processing.

In the present embodiment, the first voltage value Vth1 corresponds to an example of the first pressing force and the second voltage value Vth2 corresponds to an example of the second pressing force. The second voltage value Vth2 is preferably equal to or smaller than the first voltage value Vth1. Specific contents of the first processing and the second processing will be described below.

Figure 6:
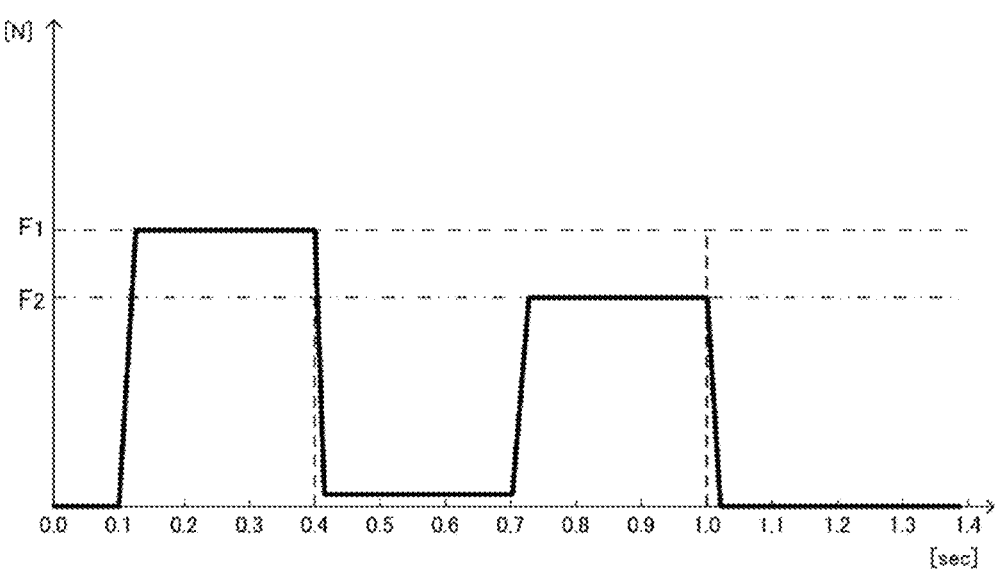
FIG. 6 is a view showing an example of a relationship between elapsed time and a pressing force applied to an operation surface 101 shown in FIG. 1.
Figure 7:
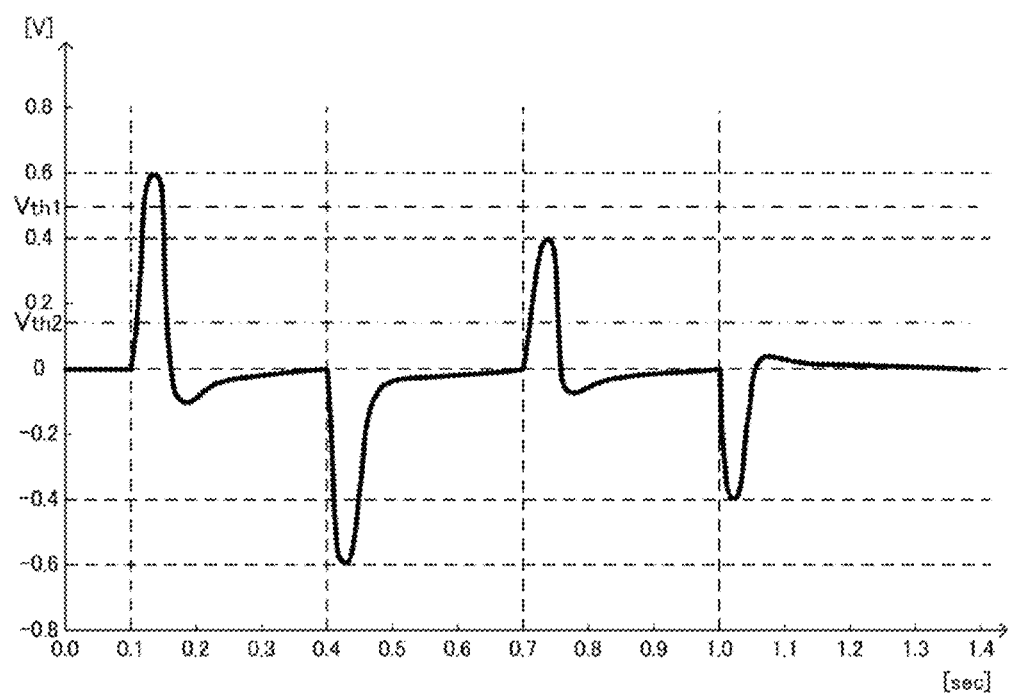
FIG. 7 is a diagram showing an example of a relationship between the elapsed time and a difference of an output voltage and a reference voltage in an amplifier circuit 19 shown in FIG. 4.

FIG. 6 is a view showing an example of a relationship between elapsed time and a pressing force applied to the operation surface 101 shown in FIG. 1. FIG. 7 is a diagram showing an example of a relationship between the elapsed time and a difference of an output voltage and a reference voltage in the amplifier circuit 19 shown in FIG. 4. In FIGS. 6 and 7, a scenario is assumed where, after the operator has applied the first pressing force in the first step to the operation surface 101 and continuously touches the part of the operation surface 101 with his or her finger, the operator applies the second pressing force to the operation surface 101 in the second step. Hereinafter, the pressing operation in the first step will be referred to as a half pressing and the pressing operation in the second step will be referred to as a full pressing, as necessary.

Note that the elapsed time shown in FIG. 6 and the elapsed time shown in FIG. 7 represent the same time. Therefor, the graph of the pressing force shown in FIG. 6 corresponds to the graph of the difference shown in FIG. 7.

As shown in FIG. 6, when the operator applies the first pressing force F1 to the operation surface 101, the operation plate 12 and the piezoelectric sensor 13 bend so as to be convex in the pressing direction as shown in FIG. 5. For this reason, as shown in FIG. 7, the output voltage of the piezoelectric sensor 13 rises to the first voltage value Vth1 or higher. As a result, the controller 20 determines that the piezoelectric sensor 13 has detected a change (F1-0) in the first pressing force.

Next, the OCAs 22, 23 used in the piezoelectric sensor 13 attempt to restore the original shape of the piezoelectric sensor 13 from the deformed shape. As a result, and as shown in FIG. 7, a stress relaxing action acts in a direction opposite to a direction in which the force changes is created by the OCAs 22, 23. Immediately after the operator has started to change the force, the force is relaxed by the OCAs 22, 23, but the stress relaxing action continues even after the change in the force ends. Hence the piezoelectric sensor 13 outputs a voltage in a direction opposite to the voltage corresponding to the change in the force after the change in the force ends.

Next, as shown in FIG. 6, when the operator releases the first pressing force F1 from the operation surface 101, but continuously touches the operation surface 101 with his or her finger, the operation plate 12 and the piezoelectric sensor 13 are restored to their original shapes. As a result, and as shown in FIG. 7, the output voltage of the piezoelectric sensor 13 is inverted to the negative side.

Next, as shown in FIG. 6, when the operator applies the second pressing force F2 to the operation surface 101 from a state where the operator continuously touches the operation surface 101 with his or her finger, the operation plate 12 and the piezoelectric sensor 13 bend so as to be convex in the pressing direction as shown in FIG. 5. For this reason, as shown in FIG. 7, the output voltage of the piezoelectric sensor 13 generates an output voltage which is higher than or equal to the second voltage value Vth2. As a result, the controller 20 determines that the piezoelectric sensor 13 has detected a change in the second pressing force (F2-approximately 0).

Next, the piezoelectric sensor 13 again outputs a voltage in a direction opposite to the voltage corresponding to the change in the force by the stress relaxing action of the OCAs.

Finally, as shown in FIG. 6, when the operator releases the second pressing pressure F2 from the operation surface 101, the operation plate 12 and the piezoelectric sensor 13 are restored to their original shapes and the output voltage of the piezoelectric sensor 13 is inverted to the negative side as shown in FIG. 7.

In the above configuration, the controller 20 determines the contents of the operation input in two steps in accordance with the pressing force applied to the operation surface 101 and executes different processings in the first and second steps. The piezoelectric sensor 13 is preferably a piezoelectric element in which a differential value of the pressing force is proportional to the output. Thus, when the operator performs the half pressing and maintains the half-pressing state, the charge generated by the piezoelectric sensor 13 becomes zero despite the piezoelectric sensor 13 being deformed.

Therefore, when the operator maintains the half-pressing state, the piezoelectric sensor 13 cannot detect the full pressing unless the pressing force of half or more is applied to the operation surface 101. As a result, when the operator maintains the half-pressing state, it is necessary to apply an extremely large pressing force to the operation surface 101.

However, in the display device 10, the touch on the operation surface 101 is detected by the electrostatic sensor 14. Thus, after applying the first pressing force to the operation surface 101, the operator releases the first pressing force but continues to touch the operation surface 101, thereby eliminating the need to perform a pressing operation at the second-step input with a force that is stronger than the force of the first-step pressing. That is, even if the operator performs a pressing operation with the second pressing force weaker than the first pressing force at the second-step input, the display device 10 can execute the second processing.

Therefore, the display device 10 of the present embodiment can improve the operability as compared with the conventional electronic device.

At the second-step input, the operator may perform pressing operation with a force that is stronger than the first-step pressing force.

Figure 8:
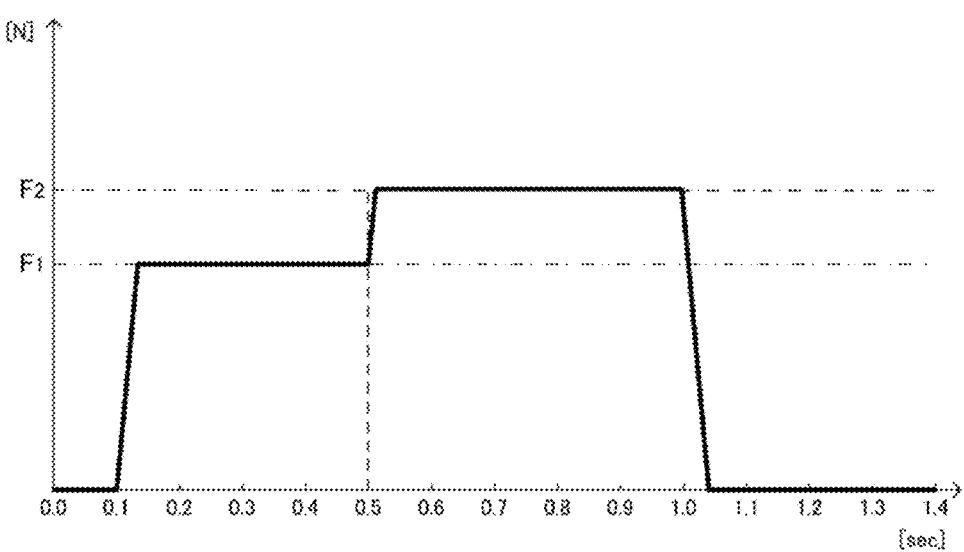
FIG. 8 is a diagram showing an example of the relationship between the elapsed time and the pressing force applied to the operation surface 101 shown in FIG. 1.
Figure 9:
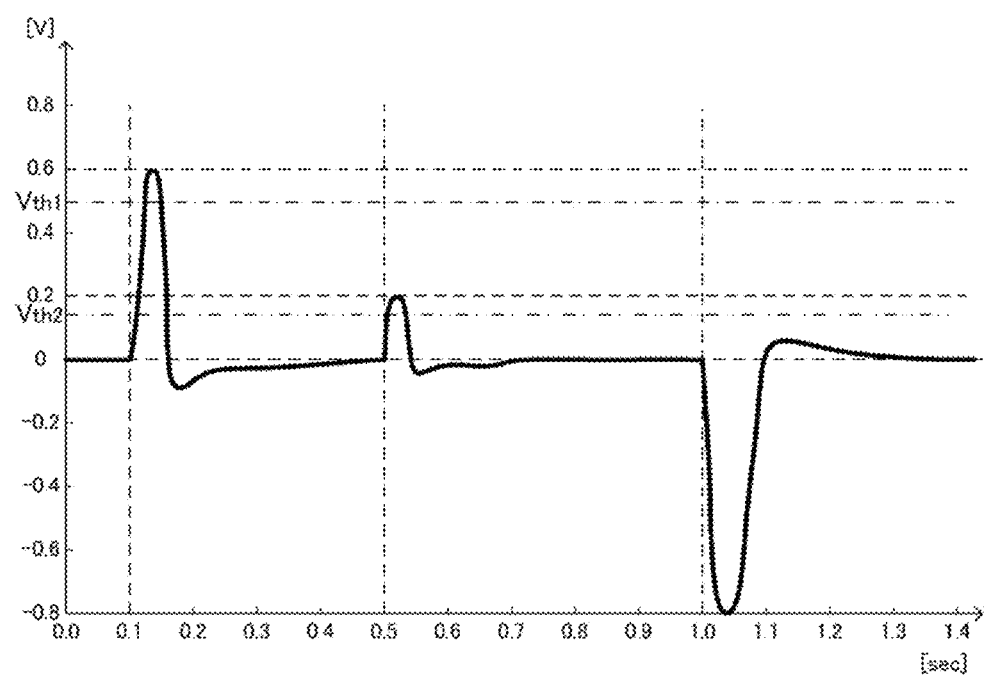
FIG. 9 is a graph showing an example of the relationship between the elapsed time and the difference of the output voltage and the reference voltage in the amplifier circuit 19 shown in FIG. 4.

FIG. 8 is a diagram showing an example of the relationship between the elapsed time and the pressing force applied to the operation surface 101 shown in FIG. 1. FIG. 9 is a graph showing an example of the relationship between the elapsed time and the difference of the output voltage and the reference voltage in the amplifier circuit 19 shown in FIG. 4. In FIGS. 8 and 9, a scenario is assumed where, after the operator has applied the first pressing force to the operation surface 101 in the first step, the operator applies the second pressing force to the operation surface 101 in the second step.

The elapsed time shown in FIG. 8 and the elapsed time shown in FIG. 9 represent the same time and therefore the graph of the pressing force shown in FIG. 8 corresponds to the graph of the difference shown in FIG. 9.

As shown in FIG. 8, when the operator applies the first pressing force F1 to the operation surface 101, the operation plate 12 and the piezoelectric sensor 13 bend so as to be convex in the pressing direction as shown in FIG. 5. Thus, as shown in FIG. 9, the output voltage of the piezoelectric sensor 13 indicates the first voltage value Vth1 or larger. As a result, the controller 20 determines that the piezoelectric sensor 13 has detected a change (F1-0) in the first pressing force.

Next, as shown in FIG. 8, when the operator applies the second pressing force F2 to the operation surface 101 from a state where the operator continues to apply the first pressing force F1 to the operation surface 101, the operation plate 12 and the piezoelectric sensor 13 bend so as to be convex in the pressed direction as shown in FIG. 5. Thus, as shown in FIG. 9, the output voltage of the piezoelectric sensor 13 indicates the second voltage value Vth2 or larger. As a result, the controller 20 determines that the piezoelectric sensor 13 has detected a change in the second pressing force (F2-F1).

Next, as shown in FIG. 8, when the operator releases the second pressing force F2 from the operation surface 101, the operation plate 12 and the piezoelectric sensor 13 are restored to their original shape. Thus, as shown in FIG. 9, the output voltage of the piezoelectric sensor 13 is inverted to the negative side.

As described above, the operator can cause the display device 10 to execute the second processing even if the operator performs a pressing operation with a force that is stronger than the pressing force in the first step at the second-step input.

Next, a scenario will be described where the controller 20 is activating the application software.

Figure 10:
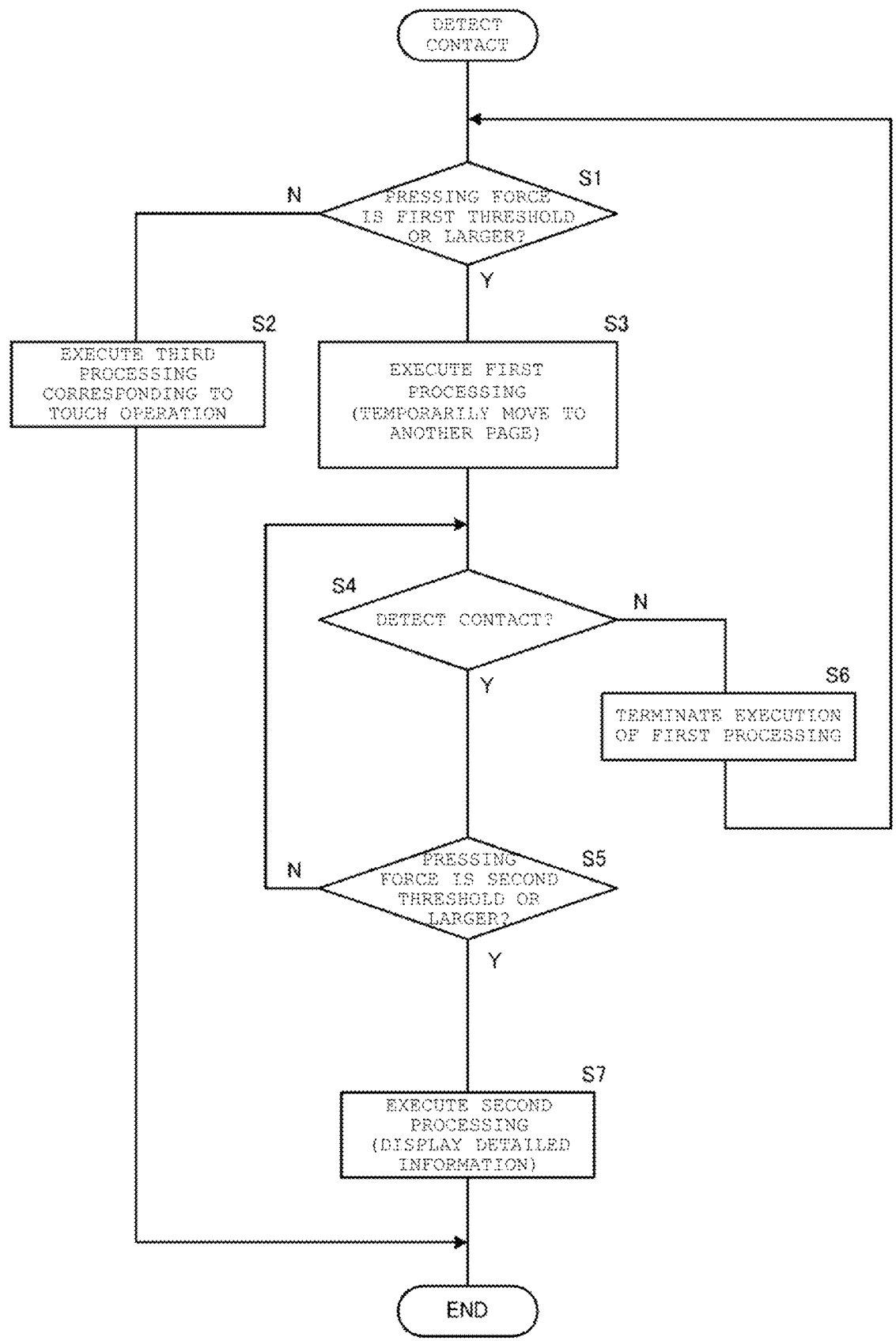
FIG. 10 is a flowchart showing an operation that is performed by a controller 20 shown in FIG. 4.

FIG. 10 is a flowchart showing an operation that is performed by the controller 20 shown in FIG. 4. In the present embodiment, as an example, a scenario will be described where the operator touches one of several icons of the browser software displayed on the operation surface 101 and the controller 20 activates the browser software. When the controller 20 activates the browser software, the communication unit 61 downforces data of a URL for a homepage, preset in the browser software, from a server device (not shown). The data includes hypertext markup language (HTML), image data, and the like. Then, the controller 20 instructs the display 30 to display the homepage in accordance with the description of the downforced HTML.

When the electrostatic sensor 14 detects a touch operation applied to the operation surface 101, for example when the operator touches a predetermined link displayed on the operation surface 101 with his or her finger, the controller 20 determines whether or not the output of the piezoelectric sensor 13 indicates the first threshold or larger (S1). In the present embodiment, the first threshold is a predetermined first voltage value Vth1 and the second threshold is a predetermined second voltage value Vth2.

When the output of the piezoelectric sensor 13 indicates a value smaller than the first threshold, the controller 20 executes third processing corresponding to a touch operation (S2), and terminates the present processing. For example, as the third processing, the controller 20 downforces from a server device (not shown) data of a URL for a predetermined link destination which the operator is touching with the finger and causes the display 30 to display a page of the predetermined link destination.

Note that S2 assumes a scenario where the operator merely performs a touch operation.

When determining that the output of the piezoelectric sensor 13 indicates the first threshold or larger in S1 above, the controller 20 executes the first processing (S3). For example, as the first processing, the controller 20 downforces from the server device (not shown) data of a URL for a predetermined link destination which the operator is pressing with the finger and causes the display 30 to temporarily display a page of the predetermined link destination.

Next, the controller 20 determines whether or not the output of the piezoelectric sensor 13 is equal to or larger than the second threshold and the electrostatic sensor 14 has continuously detected a touch operation during the period from the detection of the first pressing force to the detection of the second pressing force (S4, S5).

When the controller 20 determines that the output of the piezoelectric sensor 13 indicates the second threshold or larger and that the electrostatic sensor 14 has not continuously detected a touch operation during the period from the detection of the first pressing force to the detection of the second pressing force, the controller terminates execution of the first processing (S6) and the processing returns to S1. For example, the controller 20 terminates the temporal display of the link destination page and instructs the display 30 to display a link source page.

On the other hand, when the controller 20 determines that the output of the piezoelectric sensor 13 indicates the second threshold or larger and that the electrostatic sensor 14 has continuously detected a touch operation during the period from the detection of the first pressing force to the detection of the second pressing force, the controller executes second processing (S7) and the processing is terminated. For example, as the second processing, the controller 20 instructs the display 30 to display detailed information (HTML, etc.) of the page of the predetermined link destination.

Hereinafter, a display device according to a second embodiment of the present invention will be described with reference to the drawings.

Figure 11:
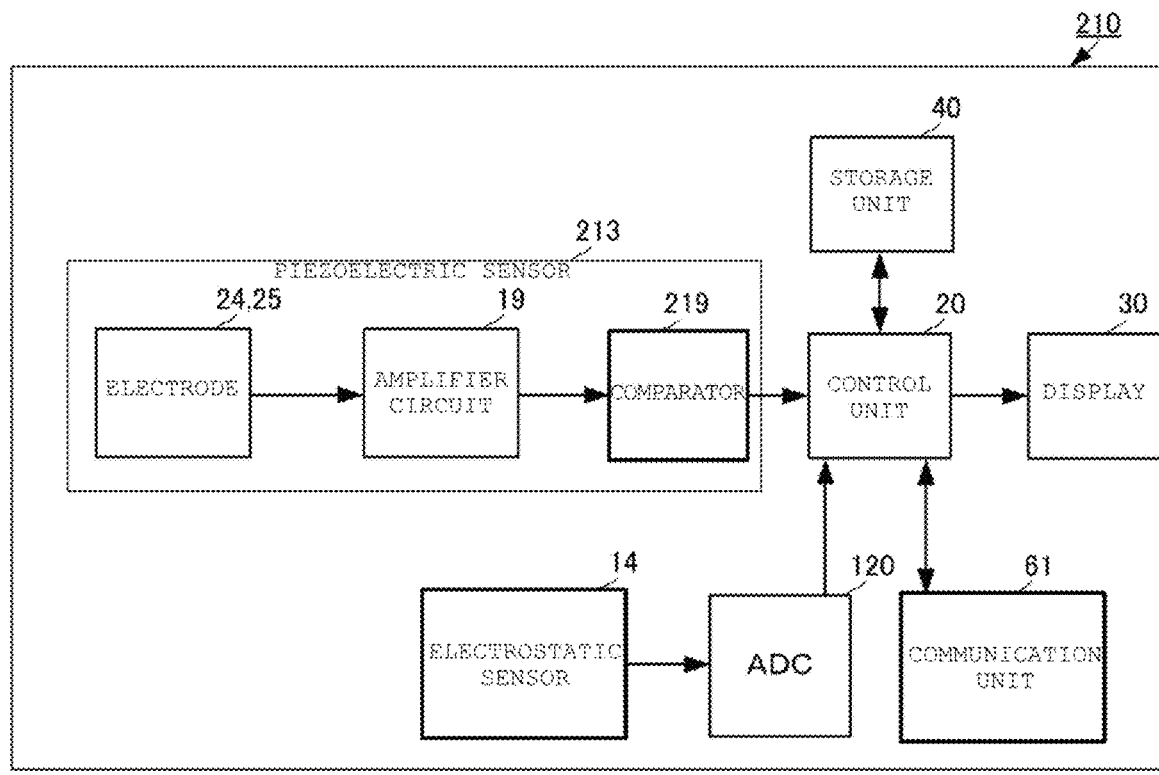
FIG. 11 is a block diagram of a display device 210 according to a second embodiment of the present invention.
Figure 12:
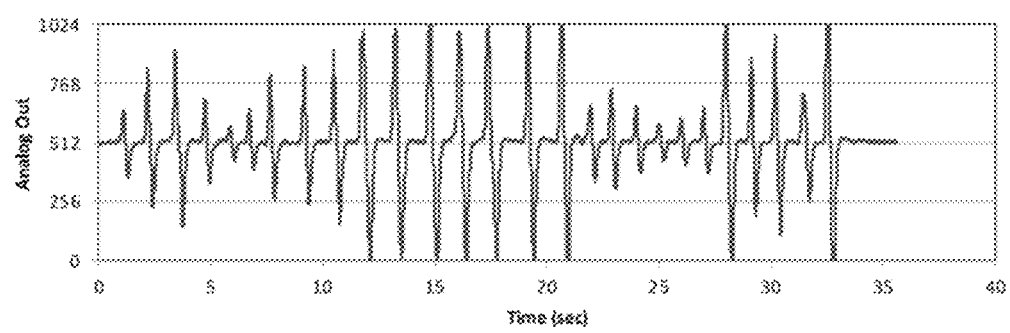
FIG. 12 is a view showing an example of an output voltage of the amplifier circuit 19 shown in FIG. 11.
Figure 13:
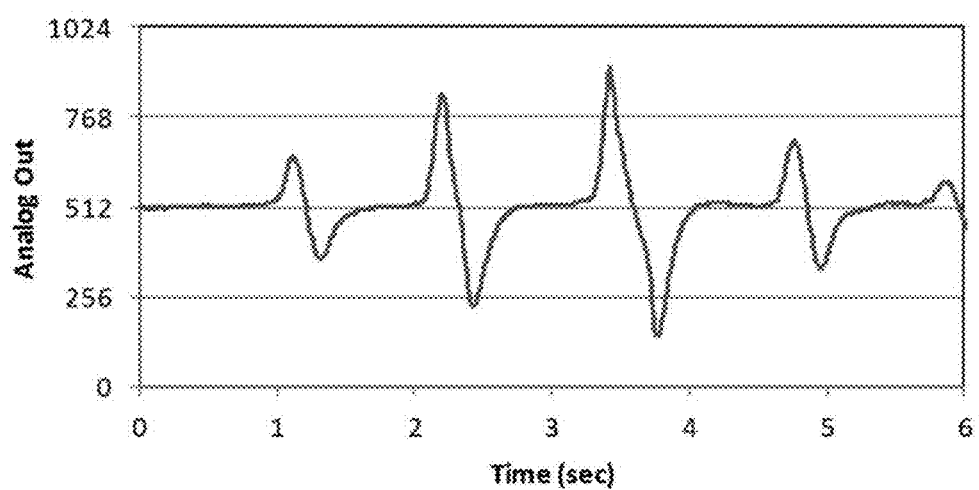
FIG. 13 is an enlarged view of a section from 0 second to 6 seconds shown in FIG. 12.
Figure 14:
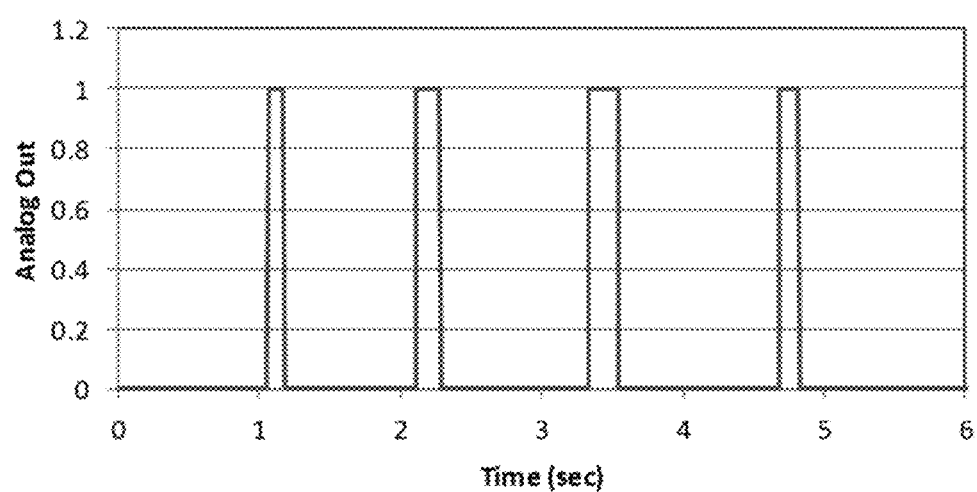
FIG. 14 is a diagram showing an example of an output voltage of a comparator 219 shown in FIG. 11.

FIG. 11 is a block diagram of a display device 210 according to a second embodiment of the present invention. FIG. 12 is a view showing an example of an output voltage of the amplifier circuit 19 shown in FIG. 11. FIG. 13 is an enlarged view of a section from 0 second to 6 seconds shown in FIG. 12. FIG. 14 is a diagram showing an example of an output voltage of a comparator 219 shown in FIG. 11.

The configuration of the display device 210 of the second embodiment is different from that of the display device 10 of the first embodiment in that a piezoelectric sensor 213 includes the comparator 219. The display device 210 does not include the AD converter 119. The other configurations are the same and the description thereof is thus omitted.

The piezoelectric film 21 preferably is highly sensitive to minute displacements. However, when a large displacement is applied, for examples as shown in the period from 14 seconds to 21 seconds in FIG. 12, the output of the piezoelectric film 21 is saturated (exceeding a value of 1024), and a larger range cannot be detected.

Therefore, in the display device 210, an analog output of the amplifier circuit 19 as shown in FIG. 11, for example is binarized by the comparator 219 as shown in FIG. 12. In the display device 210, the controller 20 determines the magnitude of a change in the pressing force in accordance with a pulse width of a pulse waveform output from the comparator 219.

Specifically, when the output signal of the piezoelectric sensor 13 indicates a first pulse width or larger, the controller 20 determines that the piezoelectric sensor 13 has detected a change in the first pressing force and executes the first processing.

On the other hand, when the output signal of the piezoelectric sensor 13 indicates a second pulse width or larger, the controller 20 determines that the piezoelectric sensor 13 has detected a change in the second pressing force. When the piezoelectric sensor 13 detects the change in the second pressing force and the electrostatic sensor 14 continuously detects a touch operation during a period from the detection of the first pressing force to the detection of the second pressing force, the controller 20 executes the second processing. The second pulse width is preferably equal to or smaller than the first pulse width. For example, the second pulse width is 80 milliseconds, and the first pulse width is preferably 100 milliseconds.

With the above configuration, in the display device 210, a touch operation on the operation surface 101 is detected by the electrostatic sensor 14. Hence in the display device 210, the touch on the operation surface 101 is detected by the electrostatic sensor 14. Thus, after applying the first pressing force to the operation surface 101, the operator releases the first pressing force and maintains a touch operation on the operation surface 101, thereby eliminating the need to perform a pressing operation at the second-step input with a force stronger than the force of the first-step pressing. That is, even if the operator performs a pressing operation with the second pressing force that is weaker than the first pressing force at the second-step input, the display device 210 can execute the second processing.

Therefore, like the display device 10, the display device 210 of the present embodiment can improve the operability as compared with the conventional electronic device. Further, in the display device 210, the AD converter 119 becomes unnecessary. In addition, the signal that is input into the controller 20 becomes more unlikely to include noise.

Next, a relationship between a peak value of the output voltage of the amplifier circuit 19 and a pulse width of the output voltage of the comparator 219 will be described.

Figure 15:
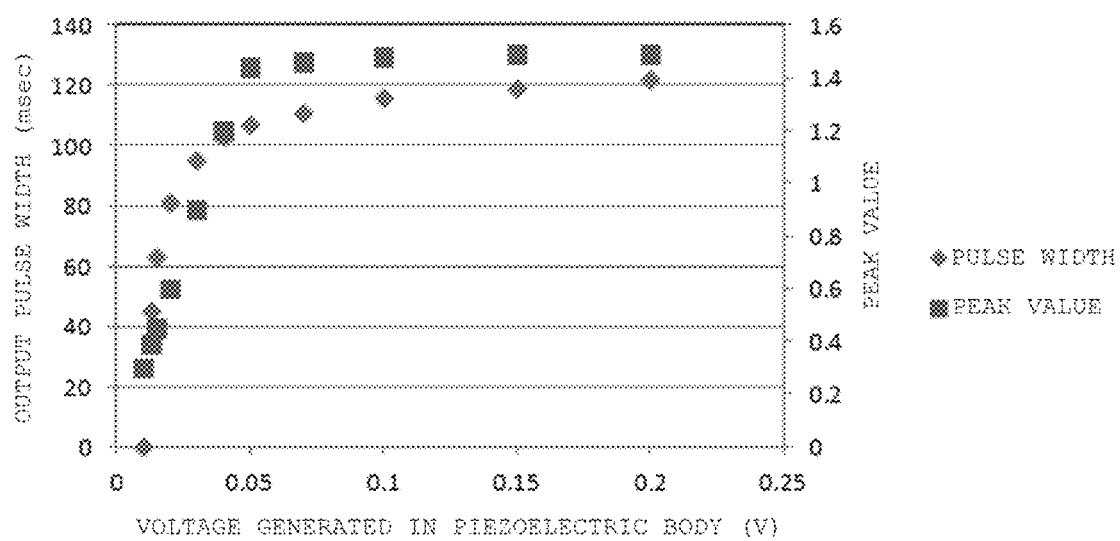
FIG. 15 is a diagram showing an example of a relationship between a peak value of the output voltage of the amplifier circuit 19 shown in FIG. 11 and a pulse width of the output voltage of the comparator 219.

FIG. 15 is a diagram showing an example of the relationship between the peak value of the output voltage of the amplifier circuit 19 shown in FIG. 11 and the pulse width of the output voltage of the comparator 219. FIG. 15 shows a result of simulating and measuring the peak value of the output voltage of the amplifier circuit 19 and the pulse width of the output voltage of the comparator 219 with respect to the voltage generated by the piezoelectric film 21.

It was revealed from the measurement results that the pulse width is not saturated even during the period where the peak value of the output voltage of the amplifier circuit 19 is saturated (e.g., period where the output voltage is 0.1 V or larger). Therefore, the display device 210 can detect a change in the pressing force in a wider range than the display device 10.

Although the display device 10 has been described as an electronic device in the above embodiment, the present invention is not limited thereto. At the time of implementation, the present invention may be applied to an electronic device (e.g., touch pad, electronic pen) not including a display.

In the above embodiment, the respective layers of the piezoelectric sensor 13 are bonded with the transparent adhesives OCAs 22, 23, but the present invention is not so limited. For example, each layer of the piezoelectric sensor 13 may be bonded with an adhesive at the time of implementation.

In the above embodiment, the display device 10 includes the electrostatic sensor 14, and the controller 20 determines using the electrostatic sensor 14 as to whether or not the operator has performed a touch operation with his or her finger, but the present invention is not limited thereto. At the time of implementation, the display device 10 may not include the electrostatic sensor 14, and the controller 20 may determine whether or not a touch operation has occurred as a function of whether or not the output of the piezoelectric sensor 13 is inverted.

In the above embodiment, the controller 20 activates the browser software, but the present invention is not limited thereto. The present invention is also applicable, for example, to mail software and map software. For example, when the operator presses an address described in a sentence of an e-mail with the first pressing force with his or her finger, the controller 20 activates the map software and instructs the display 30 to display a surrounding map of the address on the operation surface 101 as the first processing. Then, when the operator presses a predetermined point on the surrounding map displayed on the operation surface 101 with the second pressing force with the finger, the controller 20 instructs the display 30 to display detailed information on the point (a photograph of a shop at the point, information of the shop, etc.) as the second processing.

Further, in the embodiment described above, the controller 20 determines the change in the first pressing force and the change in the second pressing force, but the present invention is not so limited. The controller 20 may determine a change in the pressing force at inputs in a plurality of steps. For example, the controller 20 may determine a change in a third pressing force at a third-step input.

Finally, the description of each of the above embodiments should be considered as being illustrative in all respects and not being restrictive. The scope of the present invention is shown not by the embodiments described above but by the claims. Further, the scope of the present invention includes an equivalent scope to the scope of the claims.

DESCRIPTION OF REFERENCE SYMBOLS

10: display device
11: housing
11D1: capacitance detecting electrode
11D2: insulating substrate
11D3: capacitance detecting electrode
11D4: insulating substrate
12: operation plate
13: piezoelectric sensor
14: electrostatic sensor
19: amplifier circuit
20: controller
21: piezoelectric film
22, 23: OCA
24, 25: plate electrode
26, 27: substrate
30: display
40: storage unit
61: communication unit
100: touch panel
101: operation surface
119: AD converter
120: AD converter
210: display device
213: piezoelectric sensor
219: comparator

The invention claimed is:
1. An electronic device, comprising:
(a) an operation surface to which a user can input a touch and/or a pressing operation;
(b) a touch detection sensor that generates a touch output signal when it detects a touch operation applied to the operation surface;
(c) a piezoelectric sensor that detects a pressing force applied to the operation surface and outputs a pressing force signal indicative of either the pressing force or a differential value of the pressing force; and
(d) a controller that:
(i) compares the value of the pressing force signal to a first, constant, predetermined value and executes a first processing in which information is downloaded from a first server when the value of the pressing force signal crosses the first predetermined value; and, thereafter
(ii) compares the pressing force signal to a second, constant, predetermined value and executes a second processing when:
(a) the value of the pressing force signal crosses the second predetermined value; and
(b) the touch operation has been continuously applied to the operation surface, as indicated by the touch output signal, from the time when the pressing force signal crossed the first predeter- mined value to the time that the pressing force signal crossed the second predetermined value.

2. The electronic device in accordance with claim 1, wherein the first predetermined value is greater than or equal to the second predetermined value.

3. The electronic device in accordance with claim 1, wherein the pressing force signal is a pulsed signal, a width of each pulse of the pulsed signal being a function of a magnitude of the pressing force applied to the operation surface.

4. The electronic device in accordance with claim 3, wherein the first and second predetermined values are predetermined first and second pulse widths, respectively.

5. The electronic device in accordance with claim 1, wherein the touch detection sensor includes:
   a piezoelectric sensor which deforms from an initial shape to a bent shape in response to a pressing force applied to the operation surface; and
   an adhesive which attempts to restore the original shape of the piezoelectric sensor back to its initial shape.

6. The electronic device in accordance with claim 5, wherein the a value of the pressing force signal is initially increased upon application of a pressing force to the operation surface and subsequently reduced due to movement of the piezoelectric sensor towards its original shape due to the presence of the adhesive.

7. An electronic device, comprising:
   (a) an operation surface to which a user can input a touch and/or a pressing operation;
   (b) a touch detection sensor that generates a touch output signal when it detects a touch operation applied to the operation surface;
   (c) a piezoelectric sensor that detects a pressing force applied to the operation surface and outputs a pressing force signal indicative of either the pressing force or a differential value of the pressing force; and
   (d) a controller that:
      (i) compares the value of the pressing force signal to a first, constant, predetermined value and executes a first processing when the value of the pressing force signal crosses the first predetermined value; and, thereafter
      (ii) compares the pressing force signal to a second, constant, predetermined value and executes a second processing when:
         (a) the value of the pressing force signal crosses the second predetermined value; and
         (b) the touch operation has been continuously applied to the operation surface, as indicated by the touch output signal, from the time when the pressing force signal crossed the first predetermined value to the time that the pressing force signal crossed the second predetermined value;
   wherein:
      the pressing force signal is a pulsed signal, the width of each pulse of the pulsed signal being a function of a magnitude of the pressing force applied to the operation surface; and
      the first and second predetermined values are predetermined first and second pulse widths, respectively.

8. An electronic device, comprising:
   (a) an operation surface to which a user can input a touch and/or a pressing operation;
   (b) a touch detection sensor that generates a touch output signal when it detects a touch operation applied to the operation surface;
   (c) a piezoelectric sensor that detects a pressing force applied to the operation surface and outputs a pressing force signal indicative of either the pressing force or a differential value of the pressing force; and
   (d) a controller that:
      (i) compares the value of the pressing force signal to a first, constant, predetermined value and executes a first processing when the value of the pressing force signal crosses the first predetermined value; and, thereafter
      (ii) compares the pressing force signal to a second, constant, predetermined value and executes a second processing when:
         (a) the value of the pressing force signal crosses the second predetermined value; and
         (b) the touch operation has been continuously applied to the operation surface, as indicated by the touch output signal, from the time when the pressing force signal crossed the first predetermined value to the time that the pressing force signal crossed the second predetermined value;
   wherein the touch detection sensor includes:
      a piezoelectric sensor which deforms from an initial shape to a bent shape in response to a pressing force applied to the operation surface; and
      an adhesive which attempts to restore the original shape of the piezoelectric sensor back to its initial shape.

9. The electronic device in accordance with claim 8, wherein:
   the electronic device further includes a display; and
   the first processing is a change of an image on the display.

10. The electronic device in accordance with claim 9, wherein the image on the display is changed as a function of the position on the operation surface where a touch or and/or a pressing operation is applied.

11. The electronic device in accordance with claim 8, wherein the a value of the pressing force signal is initially increased upon application of a pressing force to the operation surface and subsequently reduced due to movement of the piezoelectric sensor towards its original shape due to the presence of the adhesive.

* * * * *